(12) United States Patent
Peterson et al.

(10) Patent No.: US 10,771,543 B2
(45) Date of Patent: Sep. 8, 2020

(54) SERVICE PROCESSOR FOR CONFIGURING SERVERS JOINING PEER TO PEER NETWORK

(71) Applicant: Lenovo (Singapore) Pte. Ltd., New Tech Park (SG)

(72) Inventors: Nathan J. Peterson, Durham, NC (US); John Scott Crowe, Durham, NC (US); Amy Leigh Rose, Chapel Hill, NC (US); Jennifer Lee-Baron, Morrisville, NC (US); James C. Loebach, Raleigh, NC (US); Nagananda Chumbalkar, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1745 days.

(21) Appl. No.: 14/100,738

(22) Filed: Dec. 9, 2013

(65) Prior Publication Data
US 2015/0163294 A1 Jun. 11, 2015

(51) Int. Cl.
*G06F 15/16* (2006.01)
*H04L 29/08* (2006.01)
(Continued)

(52) U.S. Cl.
CPC .......... *H04L 67/104* (2013.01); *G06F 9/4403* (2013.01); *H04L 41/0806* (2013.01);
(Continued)

(58) Field of Classification Search
CPC ... H04L 67/104; H04L 67/34; H04L 41/0806; H04L 41/0846; H04L 67/1046; G06F 9/4401; G06F 9/4403
(Continued)

(56) References Cited

U.S. PATENT DOCUMENTS 7,827,394 B2 * 11/2010 Brown ................ G06F 9/44505
713/1
2003/0120827 A1 * 6/2003 Fulginiti .................. G06F 8/61
719/319

(Continued)

FOREIGN PATENT DOCUMENTS

CN 101030867 A 9/2007
CN 102073513 A 5/2011

*Primary Examiner* — Vivek Srivastava
*Assistant Examiner* — Karina J Garcia-Ching
(74) *Attorney, Agent, or Firm* — John M. Rogitz; John L. Rogitz

(57) ABSTRACT

A first server includes a processor and a memory accessible to the processor. The memory bears instructions executable by the processor to determine that a server is present that has not had settings other than at most default settings applied to a basic input output system (BIOS) executable by the server to boot the server. The instructions are also executable by the processor to, based at least in part on a determination that the server is the same model of server as the apparatus, has the same BIOS version as the apparatus, and/or has the same baseboard management controller (BMC) version as the apparatus, facilitate over a peer to peer server network at least some settings in the apparatus to be provisioned to the server to establish the at least some settings in the server.

20 Claims, 7 Drawing Sheets

(51) Int. Cl.
   *H04L 12/24*  (2006.01)
   *G06F 9/4401*  (2018.01)
(52) U.S. Cl.
   CPC ...... *H04L 41/0846* (2013.01); *H04L 67/1046* (2013.01); *H04L 67/34* (2013.01)
(58) Field of Classification Search
   USPC .......................................................... 709/201
   See application file for complete search history.

(56) References Cited

U.S. PATENT DOCUMENTS

| | | | | |
|---|---|---|---|---|
| 2005/0097503 A1* | 5/2005 | Zintel | ................. | H04L 12/2803 717/100 |
| 2006/0190575 A1* | 8/2006 | Harvey | ................. | H04L 67/303 709/222 |
| 2007/0288662 A1* | 12/2007 | Chen | ................. | G06F 17/30867 709/247 |
| 2008/0130517 A1* | 6/2008 | Lee | .................... | H04L 41/0886 370/254 |
| 2008/0263190 A1* | 10/2008 | Serizawa | .............. | G06F 3/0605 709/223 |
| 2009/0073896 A1* | 3/2009 | Gillingham | ........... | G06F 9/5061 370/255 |
| 2009/0228649 A1* | 9/2009 | Porel | .................... | G06F 3/0605 711/114 |
| 2009/0282328 A1* | 11/2009 | Olsen | ................... | G06F 9/4443 715/234 |
| 2012/0278455 A1* | 11/2012 | Peng | .................. | H04L 67/1095 709/220 |
| 2013/0132553 A1* | 5/2013 | Stratton | ................. | H04L 41/50 709/223 |
| 2014/0126410 A1* | 5/2014 | Agarwal | ............... | H04W 24/02 370/252 |

* cited by examiner

SERVICE PROCESSOR FOR CONFIGURING SERVERS JOINING PEER TO PEER NETWORK

FIELD

The present application relates generally to peer to peer server networks.

BACKGROUND

Currently, configuring and replicating BIOS, BMC, RAID, settings etc. when deploying new servers in a network can be very time consuming. A system administrator is often required to boot every new computer or server and either run scripts or manually set configurations, settings, parameters, etc. As a result, businesses typically invest a great deal of money and time for such purposes, while simultaneously having at least part of the network being nonoperational while each server is booted up and/or configured.

SUMMARY

Accordingly, in a first aspect an apparatus (e.g. a computer system such as a server), includes a processor and a memory accessible to the processor. The memory bears instructions executable by the processor to determine that a computer system is present that has not had settings other than at most default settings applied to a basic input output system (BIOS) executable by the new system to boot the new system. The instructions are also executable by the processor to, based at least in part on a determination that the computer system is the same model of computer as the apparatus, has the same BIOS version as the apparatus, and has the same baseboard management controller (BMC) version as the apparatus, facilitate at least some settings in the apparatus to be provisioned to the computer system for establishing the at least some settings in the computer system.

In some embodiments, the at least some settings may include BIOS settings, and/or the apparatus and the computer system may communicate peer-to-peer with each other. Also in some embodiments, the instructions may be executable by the processor to facilitate at least some settings in the apparatus to be provisioned to the computer system responsive to a determination that the computer system has the same hard disk drive storage capacity as the apparatus, to be provisioned to the computer system by accepting a pull request from the computer system for the settings, and/or to be provisioned to the computer system by sending the settings to the computer system without a request for the settings from the computer system. If desired, the instructions may also be executable by the processor to encapsulate the settings in extensible markup language (XML) and provide the settings in XML to the computer system such that the computer system can omit establishing settings it will not use.

In another aspect, a method includes determining whether an existing computer system (ECS) can provide boot settings to the NCS responsive to a new computer system (NCS) establishing communication with a peer-to-peer network and making the boot settings available to the ECS from the NCS responsive to a determination that the ECS can provide the boot settings to the NCS.

In still another aspect, a system includes a processor and a memory accessible to the processor. The memory bears instructions executable by the processor to establish communication with an apparatus over a peer to peer network, automatically receive, boot settings from a baseboard management controller (BMC) of the apparatus, and automatically establish the boot settings in the system.

In yet another aspect, a computer readable storage medium that is not a carrier wave bears instructions executable by the processor to establish communication with a first server over a peer to peer server network. The instructions are also executable by the processor to automatically receive, from a baseboard management controller (BMC) of the first server, boot settings and to apply the boot settings to a second server that communicates over the peer to peer server network.

The details of present principles, both as to its structure and operation, can best be understood in reference to the accompanying drawings, in which like reference numerals refer to like parts, and in which:

DETAILED DESCRIPTION OF THE PREFERRED EMBODIMENT

Figure 1:
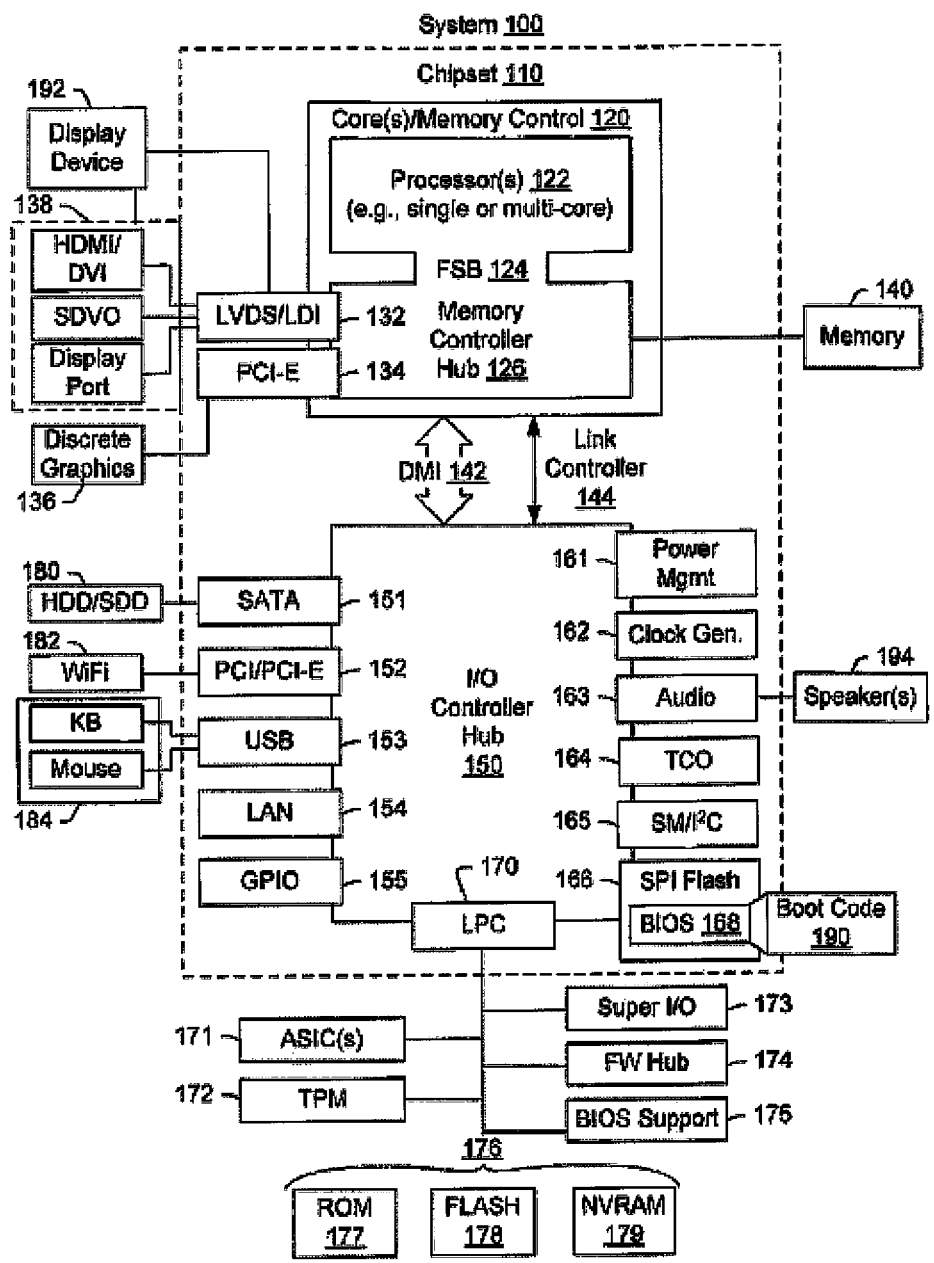
FIG. 1 is a block diagram of a computer such as a peer server in accordance with present principles.

This disclosure relates generally to device based user information. With respect to any computer systems discussed herein, a system may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now in reference to FIG. 1 an exemplary block diagram of a computer system 100 (e.g. a peer server in accordance with present principles) is shown. As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. The memory control group 120 may also include a baseboard management controller (BMC). In general, it is to be understood that servers in accordance with present principles have BMCs although present principles may similarly apply to personal computers and laptops also having BMCs. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including e.g. one of more GPUs). An exemplary system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input output system (BIOS) 168 and boot code 190. Note that BIOS as referenced herein is understood in exemplary embodiments to mean one or both of BIOS in the traditional/typical sense, and/or the relatively new standard and/or architecture of unified extensible firmware interface (UEFI). In the latter instance, BIOS may initially point to a UEFI, which can carry out the role and/or perform the functions of what BIOS would otherwise do in the "traditional" sense. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168. It is to be understood that an exemplary client device or server may include fewer or more features than shown in the system 100 of FIG. 1.

It is to be understood that the processors referred to in the following Figures may be in the form of a traditional processor or in the form of a BMC. In the embodiments involving servers, typically a BMC may be present to execute instructions rather than a traditional processor.

Figure 2:
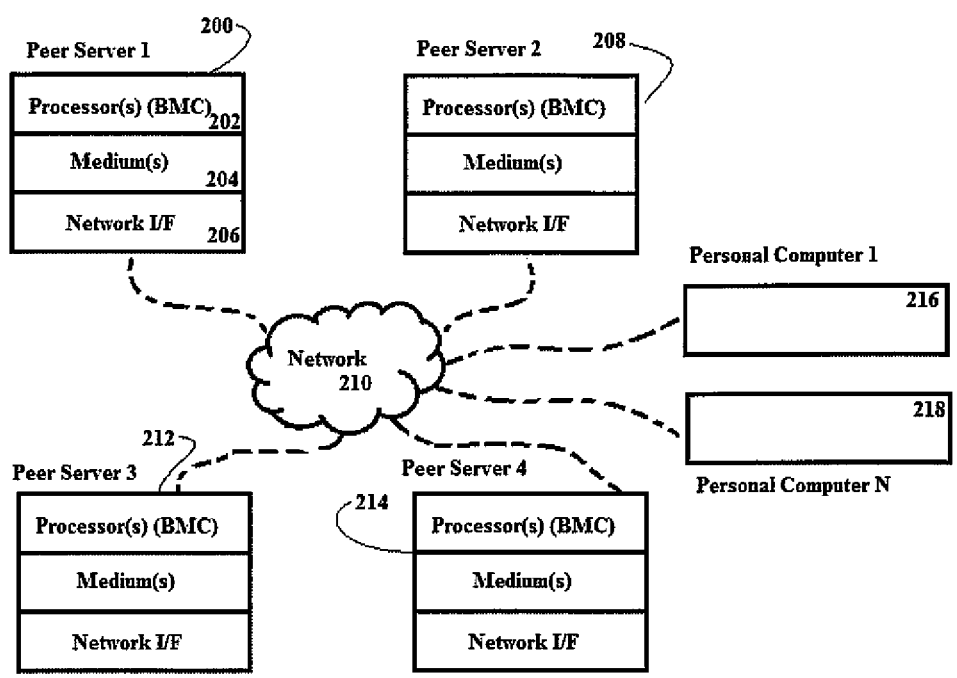
FIG. 2 is a block diagram of a peer to peer network of servers in accordance with present principles.

Turning now to FIG. 2, it shows a block diagram of a peer to peer network of servers that also includes at least one personal computer communicating over the network in accordance with present principles. As may be appreciated from FIG. 2, the peer-to-peer server network includes no so-called "master" server but only e.g. peer servers.

Thus, a first peer server 200 includes a processor that may access and execute instructions stored on a storage medium 204. A baseboard management controller (BMC) may also be included along with the processor 202, but here is not shown separately for simplicity. The first peer server 200 can also include a network interface (I/F) 206 that enables the first peer server 200 to communicate under the direction of the processor 202 with a second peer server 208 over a network 210, where the network 210 may be a peer-to-too network.

The second peer server 208, as well as any additional peer servers, here in FIG. 2 shown to be a third peer server 212 and a fourth peer server 214, may e.g. have the same components as described for the first peer server 200. E.g., the same components can include a processor and an additional BMC, a storage medium, and a network I/F. Separate numbers for each component of each additional server are omitted for simplicity. The four servers may communicate with each other over the network 210, and may also e.g. communicate with at least a first personal computer 216 and any number of other personal computers on the peer-to-peer network, here represented by personal computer N 218.

In any case, and before moving on to FIG. 3, it is to be understood at least based on the foregoing, that a server such as the system 100 may be configured to undertake present principles (e.g. communicate with other servers over a peer to peer network to undertake present principles, execute the logic described below, and/or perform any other functions and/or operations described herein).

Figure 3:
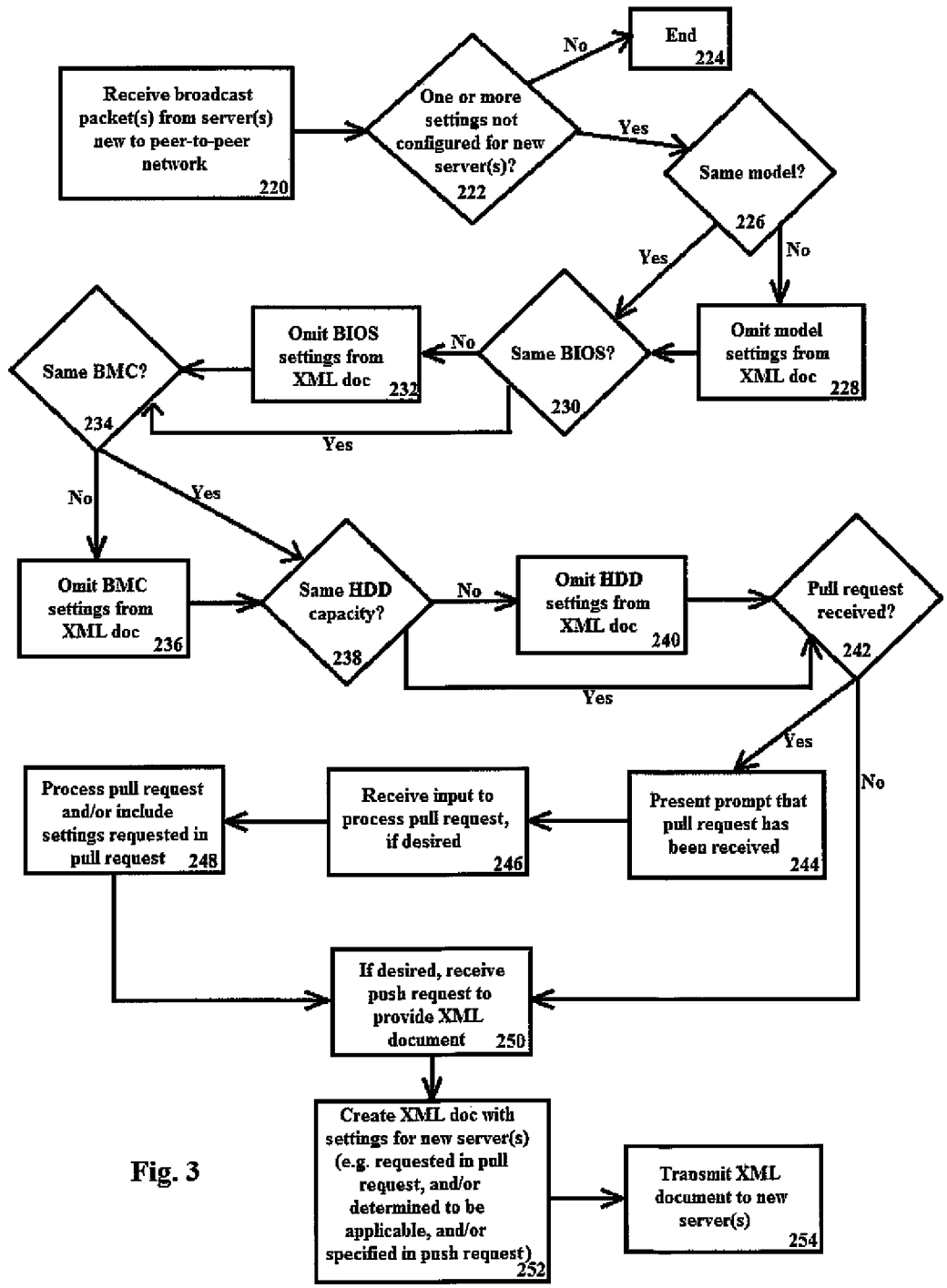
FIG. 3 is an example flowchart of logic to be executed by a processor of a server communicating over a peer to peer network to provide settings, configuration information, etc. to a server joining the network in accordance with present principles.

Now in reference to FIG. 3, logic that may be executed by an e.g. already-configured server (e.g. configured by a network administrator) is shown for when another (e.g. new) server comes online or otherwise communicates over a peer-to-peer server network. Although the logic as illustrated in FIG. 3 is directed to e.g. configuring a single new server, present principles may similarly apply to configuring plural new servers e.g. coming online at least substantially simultaneously. In any case, it is to be understood that the new server(s) does not necessarily have to have an (e.g. guest) operating system (OS) installed on it in order to receive configuration settings owing to e.g. the new server's BMC being nonetheless powered in accordance with present principles for configuration of one or more new server settings.

In any case, the logic of FIG. 3 begins at block 220 with the logic receiving a broadcast packet(s) from a new server (s) of the peer-to-peer network. The broadcast packet may be automatically sent (e.g. "broadcasted") by the new server over the peer-to-peer network to thus "announce" its presence. The packet may be used at least in part to determine which settings of the new server should be configured e.g. using an extensible markup language (XML) document in accordance with present principles.

In any case, the logic may determine at decision diamond 222 whether the new server has one or more settings that have not been configured. Note that if all (e.g. required or appropriate) settings are determined at diamond 222 to be configured, logic may end at block 224. However, if one or more settings are not configured, the logic continues to decision diamond 226, at which point the logic determines whether the new server is the same model as the server undertaking the present logic. Model settings may be omitted from an XML settings/configuration document (e.g. being (e.g. simultaneously) created or to be created) by the pre-existing server at block 228 if the new server is not of the same model, where the XML settings document may be used by the new server when provided thereto to configure one or more settings in accordance with present principles. However, a determination that the new server is the same model as the server undertaking the logic of FIG. 3 causes logic to skip block 228 and continue directly to decision diamond 230, where the logic determines whether the new server has the same BIOS version as the server undertaking the logic of FIG. 3.

A determination that the new server does not have the same BIOS version at decision diamond 230 causes the logic to omit BIOS settings from the XML document at block 232, and from block 232 the logic continues to decision diamond 234. Note, however, that if the new server does have the same BIOS version as determined at diamond 230, (e.g.

configuration settings can be included in the XML document) and logic may skip block 232 and go to decision diamond 234. At decision diamond 234, the logic determines whether the new server has the same baseboard management controller (BMC) version as the server undertaking the present logic.

A determination that the new server does not have the same BMC version at decision diamond 234 causes the logic to, at block 236, omit BMC settings from the XML document and then continue to decision diamond 238, which will be described shortly. However, if it is determined at diamond 234 that the new server does have the same BMC version, the logic may move directly to decision diamond 238 where the logic determines whether the new server has the same hard disk drive (HDD) capacity as the server undertaking the present logic.

A determination that the new server does not have the same HDD capacity at decision diamond 238 causes the logic to omit the HDD settings from the XML document at block 240 and logic then continues to decision diamond 242. However, if the HDD capacity of the new server is determined to be the same at diamond 238, logic may proceed directly to decision diamond 242. At diamond 242, the logic determines whether a pull request for e.g. configuration information for one or more settings of the new server has been received from the new server.

A negative determination at diamond 242 causes the logic to proceed directly to block 250, which will be described shortly. However, an affirmative determination by the logic at diamond 242 causes the logic to present a prompt (e.g. on the server undertaking the present logic) that a pull request has been received at block 244. The processor subsequently receives user input at block 246 to process the pull request, if desired. The processor then process the pull request and/or includes configuration settings (e.g. in an XML document in accordance with present principles) requested in the pull request at block 248. Note that in some embodiments, a new server may send a pull request to multiple (e.g. already-configured) servers and receive configuration settings from multiple pre-existing servers.

In any case, after block 248 the logic proceeds to block 250 where the logic may also receive a push request (e.g. from a user of the server undertaking the present logic) to provide the settings (e.g. in an XML document) to the new server at block 250. In some embodiments, the push request may be initiated based on a user of the server undertaking the logic of FIG. 3 determining that the configuration settings for the server are "pristine" and hence that it is preferable that such settings be applied to the new server. In any case, the logic proceeds from block 250 to block 252.

At block 252 the logic creates an XML document with configuration settings for the new server. The configuration settings may include those requested in a pull request, and/or those determined to be applicable, and/or those specified in a push request. The processor may then transmit the XML document to the new server over the peer-to-peer network at block 254.

Figure 4:
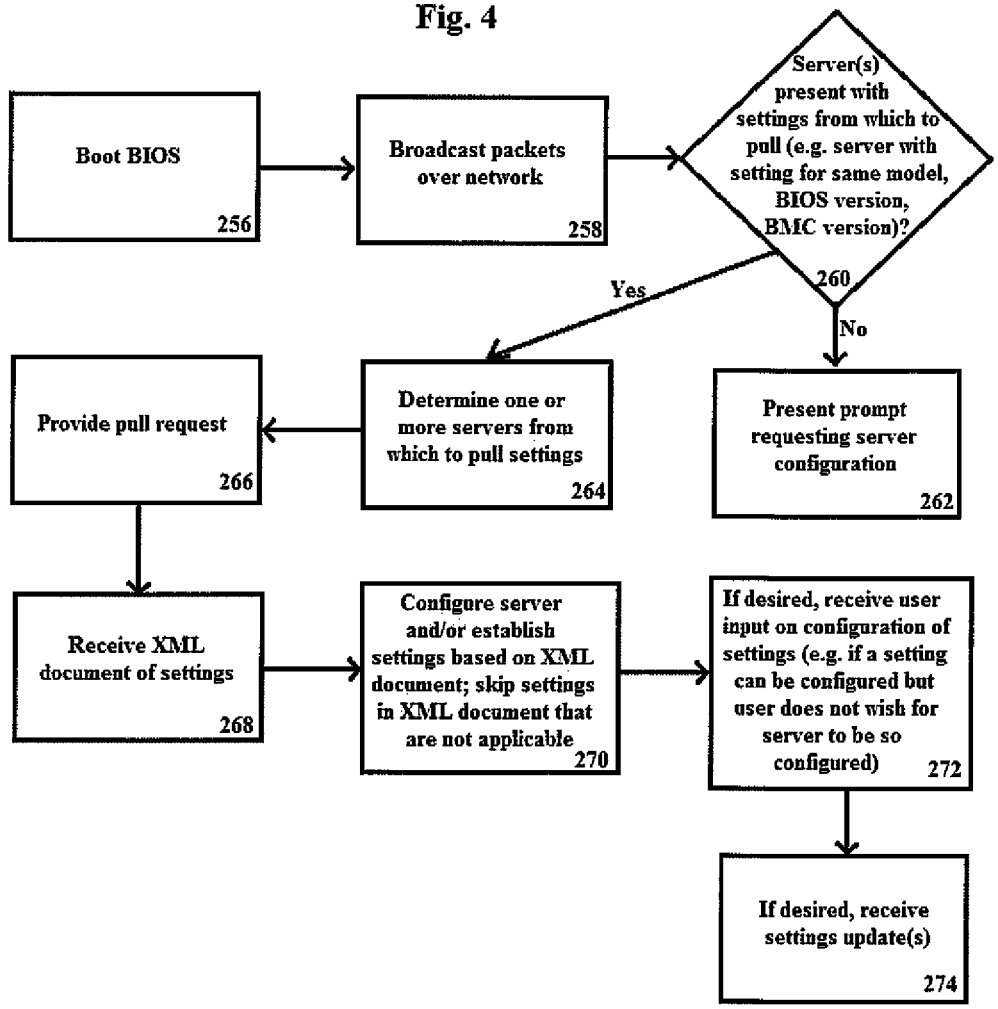
FIG. 4 is an example flowchart of logic to be executed by a processor of a server joining a peer to peer network in accordance with present principles.

Before moving to FIG. 4, it is to be generally understood that in some embodiments, e.g. XML documents including headings and their body may be utilized by a non-identical new servers (e.g. relative to the server providing the XML document) to e.g. skip portions of the XML document for settings indicated in the header that are not applicable to the new server. Thus, settings are understood to be "tagged" when included in an XML document but each setting in the document need not be adopted by a new server in all instances. E.g., if a new server does not recognize a particular heading (and/or setting to which the heading pertains) included in an XML document that has been received, it may skip that portion of the XML document and proceed to the next setting in the XML document.

Also note before moving on to FIG. 4 that in some embodiments the logic described in reference to FIG. 3 may be undertaken specifically by service processor such as a baseboard management controller (BMC). In such embodiments, the BMC may communicate with other service processors of other respective services on a peer to peer (e.g. server) network. Moreover, the configuration settings described in reference to FIG. 3 (e.g. model, HDD capacity, BIOS version, BMC version) are not the only settings that may be configured in accordance with present principles, and that other settings may also be configured. For example, network I/F card settings, host bus adapter HBA settings, and/or RAID settings may be configured. E.g., present principles apply to configuring any setting that should be configured for a new server coming online in a peer to peer network. Thus, it is to be generally understood that settings may be configured that e.g. are stored in firmware of the hardware components and/or e.g. that are OS-agnostic.

Now referring to FIG. 4, it shows logic that may be executed by a processor (e.g. a BMC) of a (e.g. new) server joining a peer to peer network in accordance with present principles. The logic begins at block 562 where the logic may boot its BIOS. Then at block 258 the logic broadcasts packets over e.g. a peer-to-peer network. The packets may be sent to the internal network and not necessarily beyond the router within the peer-to-peer network, if desired. Also if desired, the recipients of such broadcast packets may be configured within the network but need not necessarily be so configured.

After block 258, the logic proceeds to decision diamond 260 where the logic determines whether a (e.g. pre-existing on the peer network) server with settings from which to pull from is present on the network. The settings which may be pulled may in accordance with present principles include, but are not limited to, model settings, HDD capacity, BIOS version, and BMC version.

In any case, an absence of a server from which to pull settings as determined at decision diamond 260 causes the logic to move to block 262, where the new server may be present a prompt requesting configuration of settings for the new server (e.g., manual configuration). However, an affirmative determination at diamond 260 causes the logic to move to block 264 where the logic determines one or more servers from which to (e.g. actually) pull settings. The processor may then provide a pull request for configuration settings to at least one such server(s) at block 266.

Thereafter, the logic proceeds to block 268 where the logic receives an XML document that includes at least one configuration setting for the server undertaking the logic of FIG. 4 e.g. as indicated in the pull request provided at block 266 or otherwise determined (e.g. by the server providing the XML document). After the XML document is received at block 268, the logic moves to block 270 where the logic configures the new server and/or new server settings at least in part based on the settings from the XML document. The processor may also skip settings contained within the XML document that are not applicable to the new server at block 270.

In some embodiments, in addition to configuring the new server per the configuration settings in the XML document received at block 268, it is to be understood that the logic may receive user input (e.g. from a network administrator) for configuration of at least one setting for the new server at block 272. In this embodiment, the user may choose to not configure the new server per specific configuration settings contained within the XML document although they may be applicable to the new server, and/or may configure still other settings. Regardless, note that once settings have been initially configured and/or established, in some embodiments the logic may at block 274 also receive updates for configuration settings.

Figure 5:
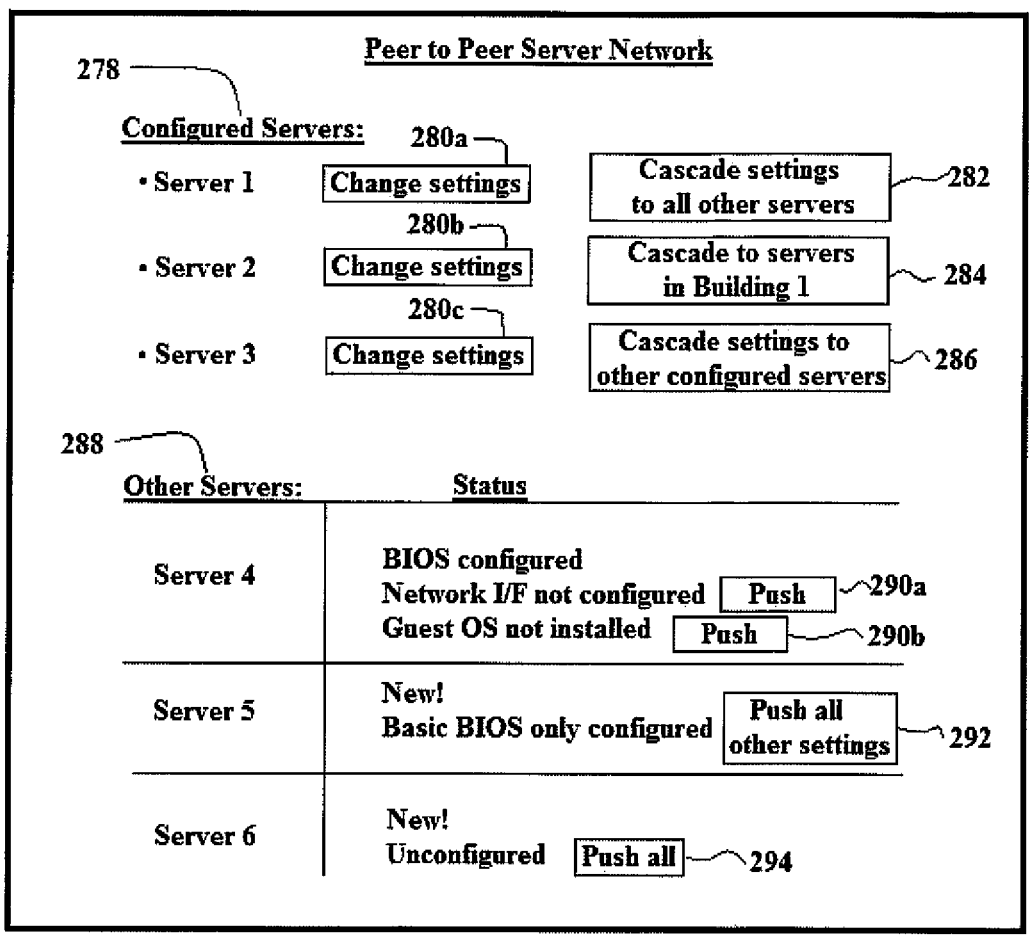
FIGS. 5-7 are example UIs presentable on a display in accordance with present principles.

Continuing the detailed description in reference to FIG. 5, a user interface (UI) 276 that may be presented on the display of a server providing configuration settings to another server in accordance with present principles is shown. A list of already configured servers 278 is shown in the present exemplary instance to include three servers. Change settings selector elements 280a, 280b, and 280c corresponding to Server 1, Server 2, and Server 3 are thus respectively shown for changing settings of those servers.

Furthermore, it is to be understood that the settings of a particular server may be "cascaded," or distributed, to other servers on the network. Accordingly, a user of the UI 276 may elect to cascade the (e.g. current) settings of Server 1 automatically without further user input responsive to selection of selector element 282. However, present principles recognize that the settings of a particular server may be cascaded to other (e.g. new and/or old) servers based on location as well. Thus, a user may choose to cascade the settings of Server 2 to all servers in Building One automatically without further user input responsive to selection of selector element 284. What's more, a user may choose to cascade settings to other servers based on the level of configuration of the other servers as well. Accordingly, settings may be cascaded to all other configured servers automatically without further user input responsive to selection of a selector element such as the element 286.

Before moving on, it is to be understood that although only three servers are included in the configured servers list 278, any number of servers may appear in this list (e.g. when configured and communicating to the network). Thus, in some embodiments a processor presenting the UI 276 is understood to be configured to detect any and/or all networked servers that are configured and thus include them in the configured servers list 278.

Still in reference to FIG. 5, the UI 276 also shows a second list 288 of other servers that are not configured in at least one aspect in accordance with present principles, and includes Servers 4-6. Note that as indicated by the status of Server 4, BIOS settings of Server 4 have been configured, but the network I/F settings have not configured and a guest OS has not been installed. A user may choose to push settings (e.g. in an XML document) from the server presenting the UI 276 and/or still other servers for the network I/F automatically without further user input by selecting selector element 290a, or for the guest OS automatically without further user input by selecting selector element 290b.

In accordance with present principles, when a server first connects to the network, it may be deemed "new" as shown in reference to Server 5. It may also be appreciated from FIG. 5 based on the status of Server 5 that it has only basic BIOS configured. Thus, a user may push all other settings (e.g., requisite and/or needed settings, and/or excluding BIOS settings) to new Server 5 (e.g. by including them in an XML document and pushing them to new Server 5) automatically without further user input responsive to selection of selector element 292.

As also shown on list 288, Server 6 is indicated as being new and (e.g. completely) unconfigured. A user may thus choose to push all configuration settings to the new Server 6 in accordance with present principles automatically without further user input responsive to selection of selector element 294, Thus, in some embodiments all applicable configuration settings may be included in an XML document and pushed to new Server 6 responsive to selection of selector element 294.

Figure 6:
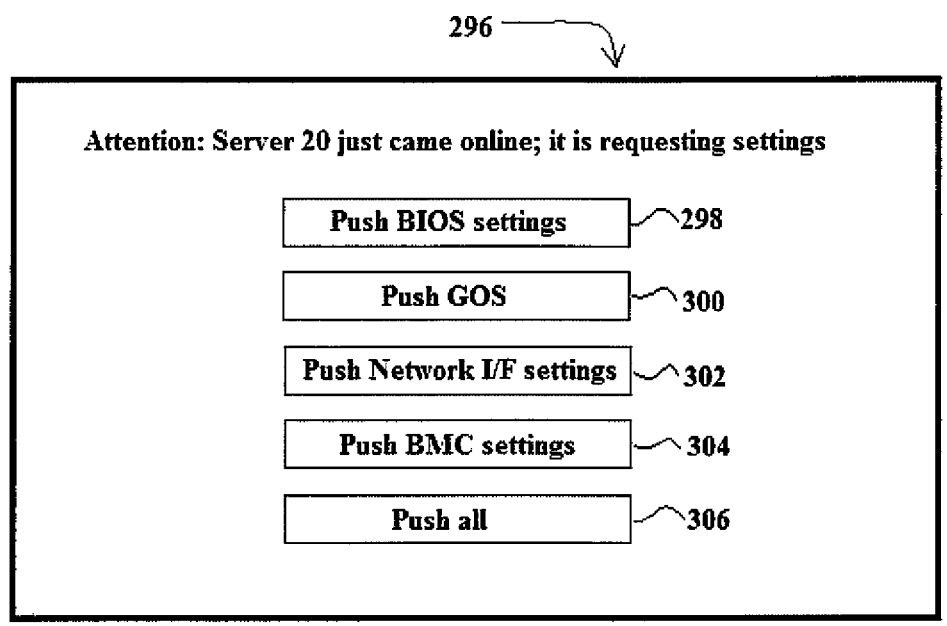

In addition to or in lieu of the UI 276 of FIG. 5 being presented on a display associated with a configured server in accordance with present principles e.g. automatically without user input when a "new" server is detected as coming online, detecting and/or determining a new server joining a network and/or requesting pull settings may cause (e.g. automatically without user input) presentation of a UI 296 on the display of the configured server, as shown in FIG. 6. As indicated by the heading of the UI 296, Server 20 has recently connected to the network and has sent a pull request for settings.

Accordingly, a user of the configured server may push particular settings to the new Server 20 by including them in an XML document and providing it (e.g. over a peer to peer network) to the new Server 20. The following settings may be pushed to Server 20 automatically without further user input based on selection of the following respective, corresponding selector elements: BIOS settings by selecting selector element 298, GOS settings by selecting selector element 300, network I/F settings by selecting selector element 302, and BMC settings by selecting selector element 304. However, note that the particular types of settings that may be pushed is understood to not be limited to those shown, but may include any settings that need configuration. Therefore, respective particular selector elements for such settings may be included in the UI 296.

In any case, note that rather than pushing individual settings (e.g. separately), all (e.g. configurable) settings may be pushed to Server 20 automatically without further user input responsive to selection of selector element 306. Thus, in some embodiments should the user select selector element 306, the configured server may include all (e.g. applicable) settings in an XML document in accordance with present principles and provide the XML document to Server 20.

However, in accordance with present principles, it is to be understood that Server 20 may also or instead be configured without sending a pull request for configuration settings. E.g., the configured server may detect that the Server 20 recently joined the network and may push settings as described herein.

Figure 7:
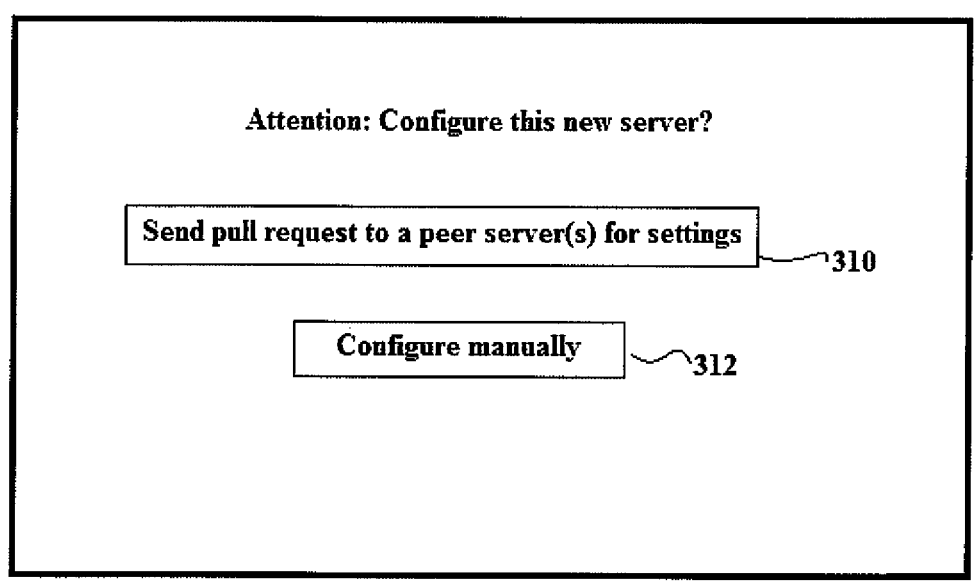

Now referring to FIG. 7, an example UI 308 is shown that may be presented on a server when it joins a e.g. peer to peer network. Thus, the UI 308 may include prompts asking a user whether to send a pull request to another server(s) for configuration settings. Thus, e.g., server 20 as described in reference to FIG. 6 may cause such a prompt to be presented.

Describing the UI 308 in more detail, it has a heading/prompt as described above that prompts the user to e.g. choose a method/way of configuring the new server. Thus, the user may send a pull request to another server(s) for configuration settings automatically without further user input by selecting selector element 310. Note that in some embodiments an authentication prompt may be presented to the user of the configured server(s) in response to a pull request from a new server, though this may not occur in all embodiments. In any case, such authentication may be executed to prevent settings from being unintentionally pushed to new boxes and/or from being pushed to unauthorized boxes. In any case, a user may also elect to configure settings manually by selecting selector element 312 (e.g. to cause a settings configuration UI for such purposes to be presented automatically without further user input responsive to selection thereof).

Without reference to any particular figure, it is to be understood that while a new server may receive some applicable settings from one other server in accordance with present principles, it is to be understood that additional settings may be received from still other (e.g. configured) servers that were determined (e.g. erroneously) to be not applicable by the one other server. In any case, it is to be understood that configuration settings may received as a result of a pull request from the server(s) receiving the settings, a push request from a pre-existing configured server(s), and/or automatically without a pull/push request.

Also without reference to any particular figure, it is to be understood that as disclosed herein, BIOS may refer to BIOS standards/architecture in the traditional sense, and/or also to Unified Extensible Firmware Interface (HEFT) standards/architecture.

Note that while XML documents have been described herein for configuration of settings, still other documents, protocols, and/or languages may be used for such purposes.

Furthermore, a BMC or other service processor is understood to communicate with other service processors and not necessarily using an (e.g. guest) operating system such as Windows since e.g. such an operating system need not be installed on new server yet to configure settings in accordance with present principles.

Regarding the pushes and pulls described herein, note that which one or whether a combination of both should be used may be determined based on e.g. network administrator preference, and/or may be determined based on server models, and/or server and/or network infrastructure.

It may now be appreciated based on present principles that after a user sets up e.g. one or two "pristine" servers on a peer to peer server network, new systems subsequently coming online may be recognized by the pristine server(s). If the user has already configured a system e.g. identical in at least some respects to the new one coming online, the user may be provided with the option of either going into the BMC of the existing pristine server or new server, and initiating a respective push or pull request of settings such as e.g. BIOS settings. Sharing of settings between systems may be based on the fact that the systems are identical in e.g. one or more aspects such as e.g. model of the system, BMC version, BIOS version, HDD size, etc. Because the BMC is powered on even if e.g. the itself system has not been booted (e.g. and/or fully powered on), other systems can nonetheless identify configurations and/or parameters that should be set using small broadcast packets when the server is plugged in and the network cable is attached thereto. A BMC of a pristine server may then be able to recognize the difference between configured and unconfigured systems to help prevent overwriting already configured servers.

Nonetheless, it is to be understood that present principles apply to instances where e.g. a "pristine" server and a server coming online for which one or more settings should be configured need not be identical in all respects (e.g. need not have respective identical components to still undertake present principles). For instance, the BIOS versions, BMC versions, etc., of the two servers need not exactly match. For example, if a setting was abstracted within XML, such as e.g. <Power On-Logo=True>, and if two different versions of BIOS recognize such an XML structure, then the differing versions of BIOS in the respective servers may nonetheless still have settings configured per this (e.g. single) exemplary XML information.

While the particular SERVICE PROCESSOR FOR CONFIGURING SERVERS JOINING PEER TO PEER NETWORK is herein shown and described in detail, it is to be understood that the subject matter which is encompassed by the present application is limited only by the claims.

What is claimed is:

1. An apparatus, comprising:
a processor; and
storage accessible to the processor and bearing instructions executable by the processor to:
determine that a new computer system is present that has not had settings other than at most default settings applied to a basic input output system (BIOS) executable by the new computer system to boot the new computer system;
based at least in part on a determination that the new computer system one or more of is the same model of computer as the apparatus, has the same BIOS version as the apparatus, and has the same baseboard management controller (BMC) version as the apparatus, facilitate at least first settings to be provisioned to the new computer system to establish the first settings in the new computer system at least in part based on:
encapsulation of the first settings in an extensible markup language (XML) document;
omission of at least a second setting from the XML document, the omission being made based at least in part on a determination that the new computer system one or more of is not the same model of computer as the apparatus, does not have the same BIOS version as the apparatus, and does not have the same baseboard management controller (BMC) version as the apparatus; and
transmission of the XML document to the new computer system.

2. A method, comprising:
responsive to a new computer system (NCS) establishing communication with a peer-to-peer network, determining whether an existing computer system (ECS) can provide boot settings to the NCS; and
based on a determination that the ECS can provide the boot settings to the NCS, making the boot settings available to the NCS from the ECS;
wherein the method, to make the boot settings available, comprises:
encapsulating the boot settings in an extensible markup language (XML) document;
omitting at least one other setting from the XML document that is determined to not be applicable to the NCS; and
providing the XML document to the NCS.

3. A system, comprising:
a processor; and
storage accessible to the processor and bearing instructions executable by the processor to:
establish communication with an apparatus over a peer to peer network;
responsive to the communication being established, present a user interface (UI) on a display accessible to the system, the UI comprising a prompt regarding whether to transmit a pull request for settings to apply to the system;
receive, from a baseboard management controller (BMC) of the apparatus, the settings; and
establish the settings in the system.

4. The system of claim 3, wherein the instructions are further executable by the processor to receive the settings in extensible markup language (XML) and to skip settings in the XML that will not be used.

5. A computer readable storage medium that is not a transitory signal, the computer readable storage medium comprising instructions executable by a processor to:
 establish communication with a first server;
 receive, from the first server, settings pertaining to configuration of a baseboard management controller (BMC);
 apply, to a second server, the settings pertaining to configuration of a baseboard management controller (BMC); and
 responsive to a determination that there is no device available from which to receive settings, present a prompt on a display accessible to the processor, the prompt requesting configuration of the second server.

6. The apparatus of claim 1, wherein the instructions are executable by the processor to:
 facilitate the first settings to be provisioned to the new computer system based at least in part on a location of the new computer system.

7. The apparatus of claim 6, wherein the location is a particular building.

8. The apparatus of claim 1, wherein the instructions are executable by the processor to:
 responsive to detection of the new computer system, present a user interface (UI) on a display accessible to the apparatus, the UI comprising respective selector elements that are selectable to push, to the new computer system, BIOS settings, guest operating system (GOS) settings, and network interface settings.

9. The apparatus of claim 1, wherein the instructions are executable by the processor to:
 responsive to detection of the new computer system, present a user interface (UI) on a display accessible to the apparatus, the UI comprising a selector element that is selectable to push, to the new computer system, settings pertaining to configuration of a BMC.

10. The apparatus of claim 1, wherein the instructions are executable by the processor to:
 present a prompt on a display accessible to the apparatus that a pull request for settings has been received.

11. The method of claim 2, comprising:
 based on the determination that the ECS can provide the boot settings to the NCS, presenting a user interface (UI) on a display accessible to the ECS, the UI comprising a selector element that is selectable to push, to the NCS, the boot settings; and
 responsive to selection of the selector element, making the boot settings available to the NCS from the ECS.

12. The method of claim 2, wherein the at least one other setting that is omitted from the XML document comprises at least one hard disk drive (HDD) setting.

13. The method of claim 2, wherein the at least one other setting that is omitted from the XML document comprises at least one basic input output system (BIOS) setting.

14. The method of claim 2, wherein the at least one other setting that is omitted from the XML document comprises at least one setting for configuring a baseboard management controller (BMC) on the NCS.

15. The method of claim 2, comprising:
 based on a location of the NCS, making the boot settings available to the NCS from the ECS.

16. The method of claim 2, comprising:
 presenting a prompt on a display accessible to the ECS that a pull request for settings has been received.

17. The system of claim 3, wherein the UI comprises a selector element that is selectable to transmit the pull request.

18. The system of claim 17, wherein the selector element is a first selector element, and wherein the UI comprises a second selector element that is selectable to configure the system manually.

19. The system of claim 18, wherein the UI is a first UI, and wherein the instructions are executable by the processor to:
 responsive to selection of the second selector element, present a second UI on the display at which the system may be configured manually.

20. The computer readable storage medium of claim 5, wherein the prompt is a first prompt, and wherein the instructions are executable by the processor to:
 responsive to the communication being established, present a first user interface (UI) on a display accessible to the processor, the first UI comprising a second prompt regarding whether to transmit a pull request for settings to apply to the second server, the first UI further comprising a first selector element that is selectable to transmit the pull request and a second selector element that is selectable to configure the second server manually; and
 responsive to selection of the second selector element, present a second UI on the display at which the second server may be configured manually.

* * * * *